(12) United States Patent
Bogue et al.

(10) Patent No.: US 7,695,585 B2
(45) Date of Patent: Apr. 13, 2010

(54) REBONDING A METALLIZED FABRIC TO AN UNDERLYING LAYER

(75) Inventors: William F. Bogue, Hebron, CT (US); Stuart Simmons, Northford, CT (US)

(73) Assignee: United Technologies Corporation, Hartford, CT (US)

( * ) Notice: Subject to any disclaimer, the term of this patent is extended or adjusted under 35 U.S.C. 154(b) by 620 days.

(21) Appl. No.: 11/517,769

(22) Filed: Sep. 8, 2006

(65) Prior Publication Data

US 2008/0060752 A1  Mar. 13, 2008

(51) Int. Cl.
*B29C 65/00* (2006.01)
*B31B 1/60* (2006.01)
*B32B 37/00* (2006.01)
*B29C 73/00* (2006.01)
*B32B 43/00* (2006.01)
*B32B 38/04* (2006.01)

(52) U.S. Cl. .......................... 156/250; 156/60; 156/94

(58) Field of Classification Search .................. 156/94, 156/250, 60
See application file for complete search history.

(56) References Cited

U.S. PATENT DOCUMENTS

| 1,624,691 | A | * | 4/1927 | Thoma ....................... 144/330 |
| 4,121,958 | A | * | 10/1978 | Koonts ....................... 156/79 |
| 5,976,997 | A | | 11/1999 | Meaney et al. |
| 2004/0202807 | A1 | * | 10/2004 | Earnest ....................... 428/36.1 |

* cited by examiner

*Primary Examiner*—Philip C Tucker
*Assistant Examiner*—Michael N Orlando
(74) *Attorney, Agent, or Firm*—Kinney & Lange, P.A.

(57) ABSTRACT

A method and system for repairing an insulation blanket having a metallized fabric that becomes disbanded from an underlying layer of the insulation blanket. The method includes cutting a first slit in the metallized fabric near a disbanded portion of the fabric, inserting a repair material through the first slit such that the repair material is between the disbanded portion of the fabric and the underlying layer, and adhering the disbonded fabric and the underlying layer to the repair material to restore the functionality of the metallized fabric.

18 Claims, 5 Drawing Sheets

REBONDING A METALLIZED FABRIC TO AN UNDERLYING LAYER

BACKGROUND OF THE INVENTION

The present invention relates to a method of rebonding two layers of fabric. More particularly, the invention relates to a method of repairing an insulation blanket in which a metallized fabric layer has become disbonded from an underlying fabric layer.

Insulation blankets are commonly used in various parts of a gas turbine engine for thermal protection. The insulation blanket may be formed from layers of ceramic fabric and other insulative materials. A metallized fabric layer may commonly be used as an outer layer of the insulation blanket to protect the underlying insulative materials. However, over time, the metallized fabric layer may become disbanded from an underlying layer due to adhesive fatigue caused by pressure and temperature changes during operation of the engine.

In some cases, a detached area of the metallized fabric layer may be small enough that the fabric layer may be reattached directly to the underlying layer using known repair techniques, such as applying an adhesive to the detached area and curing the repair area. However, in some cases, the detached area may be so large that these repair techniques are not feasible, given that a certain percentage of the metallized fabric layer may need to remain unattached from the underlying layer. (This limitation is based on a potential need to maintain a porous barrier that air may flow through.) Alternatively, replacing the insulation blanket is expensive.

There is a need for a method of repairing an insulation blanket in those situations in which a large portion of the metallized fabric layer has become disbanded from the underlying ceramic fabric.

BRIEF SUMMARY OF THE INVENTION

The present invention is a method and system for repairing an insulation blanket having a metallized fabric that has become disbanded from an underlying layer of the insulation blanket. The method includes cutting at least a first slit in the metallized fabric near a disbonded portion of the fabric, inserting a repair material through the first slit such that the repair material is between the disbonded portion of the fabric and the underlying layer, and adhering both the disbanded fabric and the underlying layer to the repair material. The repair material delivers an even and metered amount of adhesive to a controlled area within the repair.

DETAILED DESCRIPTION

Figure 1:
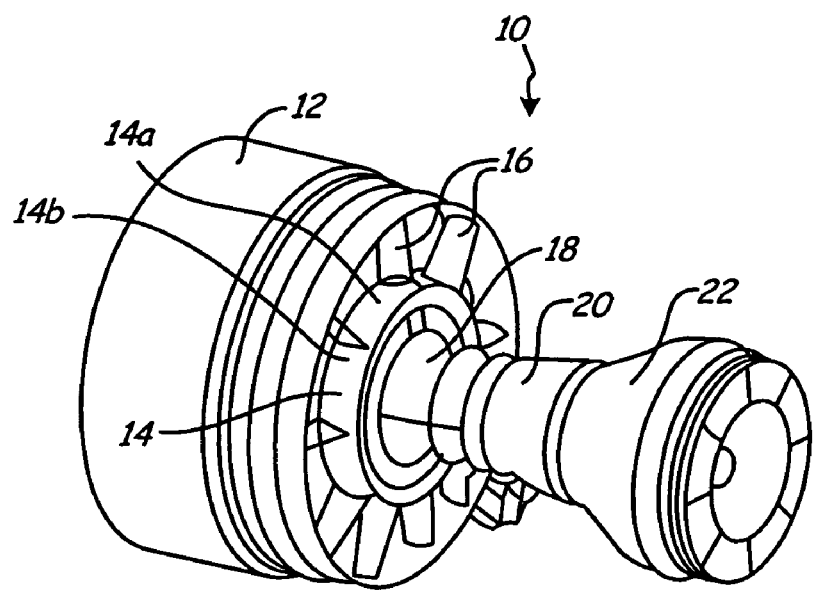
FIG. 1 is a perspective view of a gas turbine engine, including a plurality of fan exit liner segments supported by struts on an intermediate case of the engine.

FIG. 1 is a perspective view of a high bypass gas turbine engine assembly 10, including intermediate case 12, fan exit liner segments 14, struts 16, high pressure compressor (HPC) 18, high pressure turbine 20, and low pressure turbine 22.

Struts 16 are configured with flanges to mount liner segments 14 to each cavity between struts 16 of intermediate case 12. Inner liner segments 14, including first segment 14a and second segment 14b, are configured to fit between each of nine struts 16. Liner segments 14 are designed to follow a contour of each strut 16 to establish an inner diameter flow path surface of a bypass air stream. Liner segments 14 may also include conduits that allow bleed air to be extracted from HPC 18 to the bypass air stream.

Figure 2:
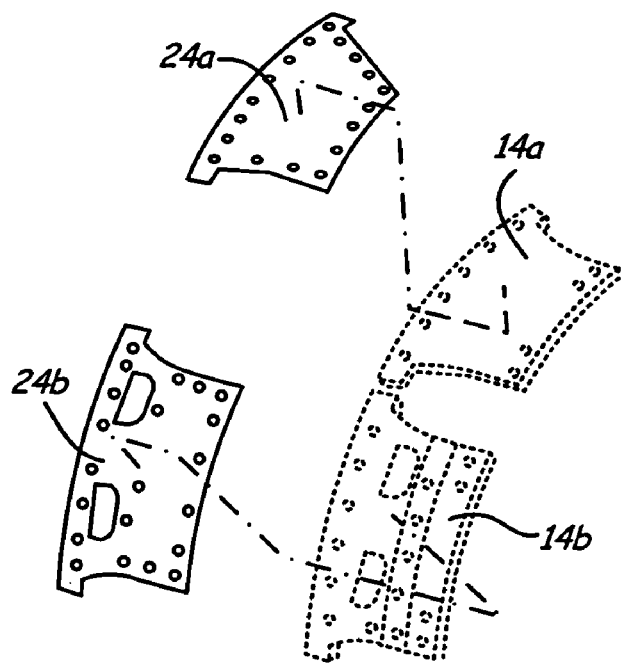
FIG. 2 is an enlarged view of first and second liner segments of FIG. 1, including insulation blankets that are attached to an inner surface of the liner segments.

FIG. 2 is an enlarged view of first and second liner segments 14a and 14b of FIG. 1. As also shown in FIG. 2, insulation blankets 24a and 24b are configured to attach to an inner surface of liner segments 14a and 14b. Insulation blankets 24a and 24b are designed to protect inner liner segments 14 from high temperatures in and around HPC 18, and also to provide fire containment. If a fire were generated in HPC 18, insulation blankets 24a and 24b may contain or resist a spread of fire in engine assembly 10. Additional insulation blankets not shown in FIG. 2 are similarly attached to seven additional liner segments (also not shown in FIG. 2) that are similar to first and second segments 14a and 14b.

Liner segments 14 may be formed from various composites used in turbine engine components, including, but not limited to, a carbon epoxy composite. As described in further detail below, insulation blankets 24a and 24b may be formed from any suitable material, including, but not limited to, ceramic fabrics. Insulation blankets 24a and 24b may be bonded to liner segments 14a and 14b using high temperature adhesives, including, but not limited to, silicone rubber.

Insulation blankets 24a and 24b may include an outer layer of metallized fabric configured to be attached to and protect underlying layers of ceramic fabric. However, during operation of engine assembly 10, temperature and pressure variations may cause the metallized fabric to detach or disbond from an underlying ceramic fabric. As such, it may be necessary to either repair or replace a damaged insulation blanket on liner segments 14.

Figure 3:
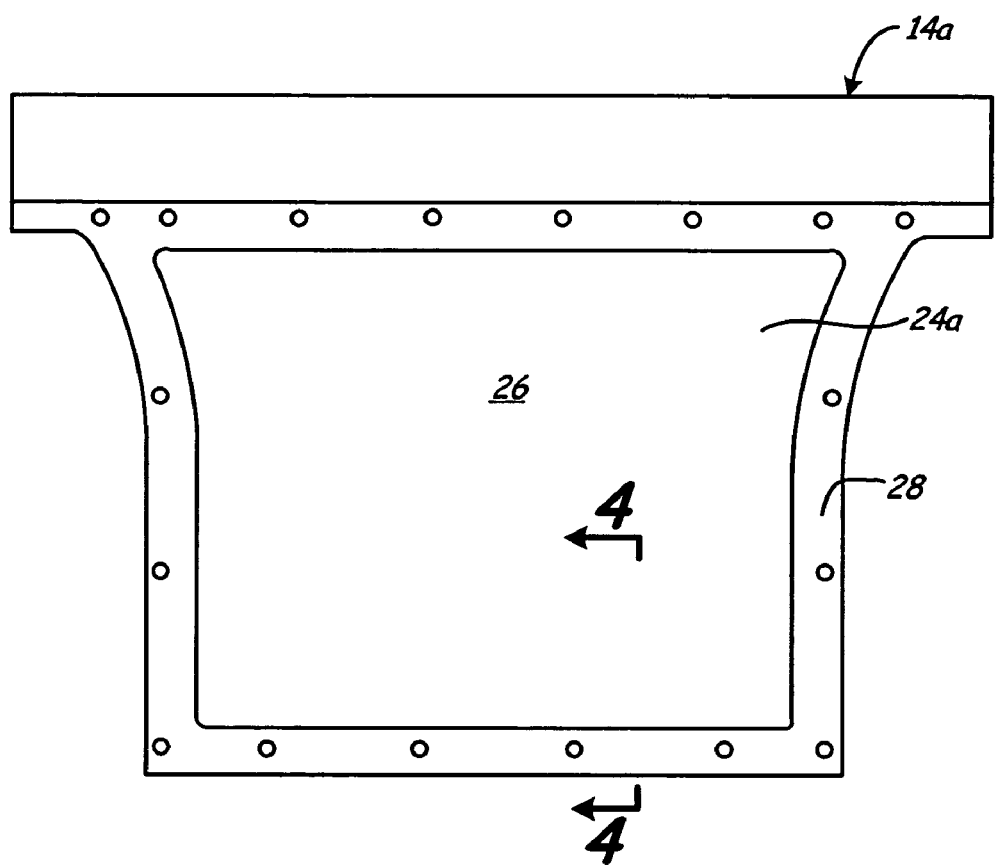
FIG. 3 is a perspective view of an inner surface of the first liner segment of FIG. 2, including the insulation blanket.

FIG. 3 is a perspective view of an inner surface of liner segment 14a of FIG. 2, including insulation blanket 24a having outer layer 26, and backing 28. Outer layer 26 of insulation blanket 24a may be formed of a metallized fabric; more specifically, layer 26 may be a woven fabric made from glass or ceramic, in which individual fibers have been coated with a metal, such as aluminum. As shown in FIG. 3, backing 28 is used to frame insulation blanket 24a, and provide additional retention of blanket 24a around a perimeter of liner segment 14a.

Figure 4:
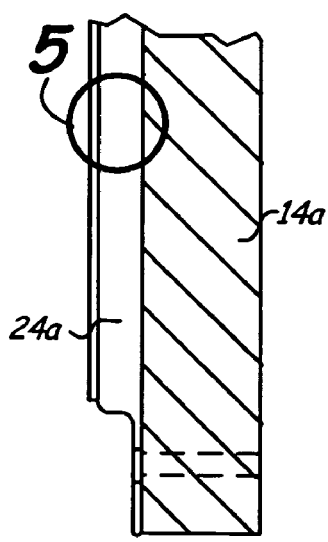
FIG. 4 is a cross-sectional view of a portion of the first liner segment and insulation blanket of FIG. 3.

FIG. 4 is a cross-sectional view of a portion of liner segment 14a of FIG. 3 showing insulation blanket 24a attached to liner segment 14a.

Figure 5:
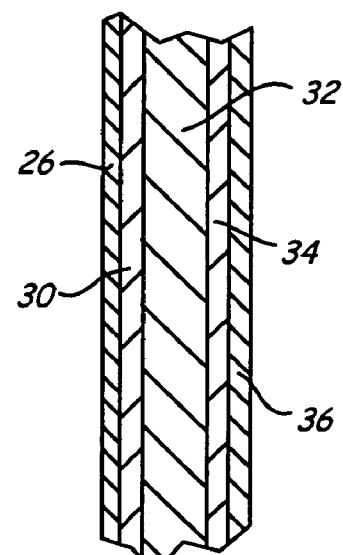
FIG. 5 is a cross-sectional view of a portion of the insulation blanket in FIG. 4.

FIG. 5 is a cross-sectional view of an enlarged portion of insulation blanket 24a of FIG. 4, which includes outer layer 26, ceramic layer 30, insulation 32, second ceramic layer 34, and glass cover 36. As stated above, outer layer 26 may be a metallized fabric, such as an aluminized fabric, and is bonded to underlying ceramic layer 30 by a thin layer of adhesive, such as, but not limited to, silicone rubber. Ceramic layers 30 and 32 may be a woven fabric. Insulation 32 may be a batting material, such as a non-woven ceramic layer. Ceramic layers 30 and 34 and insulation 32 form the insulative material for insulation blanket 24a, and layers 30-34 may be stitched together using conventional techniques. Glass layer 36 may be attached or molded to layer 34 and to liner segment 14a using an adhesive, commonly silicone rubber.

As mentioned above, metallized fabric 26 may become detached from ceramic layer 30. The present invention relates to a method for repairing insulation blanket 24a, as an alternative to replacing insulation blanket 24a, which may be costly.

In some cases, only a small portion of metallized fabric 26 may become disbonded from underlying ceramic layer 30, and the disbonded portion of fabric 26 may be re-bonded to ceramic layer 30 through conventional techniques. For example, an adhesive may be applied to the inner surface of the disbonded fabric and then cured to reattach fabric 26 to ceramic layer 30. However, in some cases, the disbonded area may be too large for this type of repair technique.

Metallized fabric 26 is typically configured as a quilt cover to protect underlying layers of insulation blanket 24a from dirt and other materials in and around a cavity surrounding HPC 18. Moreover, metallized fabric 26 is also configured to protect underlying layers of blanket 24a from any direct contact with a flame. However, in this type of application in which the insulation blanket is part of a gas turbine engine, an attachment between metallized fabric 26 and underlying layer 30 is designed such that the attachment is not airtight. Insulation blanket 24a is made of various layers of porous fabrics, including fabric 26, and it may be important that pressure equilibration is not restricted through metallized fabric 26 during operation of engine 10. For re-bonding a detached portion of metallized fabric 26, a repair adhesive will obstruct any remaining open pores in metallized fabric 26. In that case, only a percentage of a total area of metallized fabric 26 may be re-bonded to underlying layer 30.

If a large area of fabric 26 becomes disbonded from layer 30, it may not be feasible to reattach fabric 26 and still remain below the total allowable area of attachment between layers 26 and 30. Moreover, it may be difficult to control a uniformity of the adhesive applied to the inner surface of disbonded fabric 26.

Figure 6:
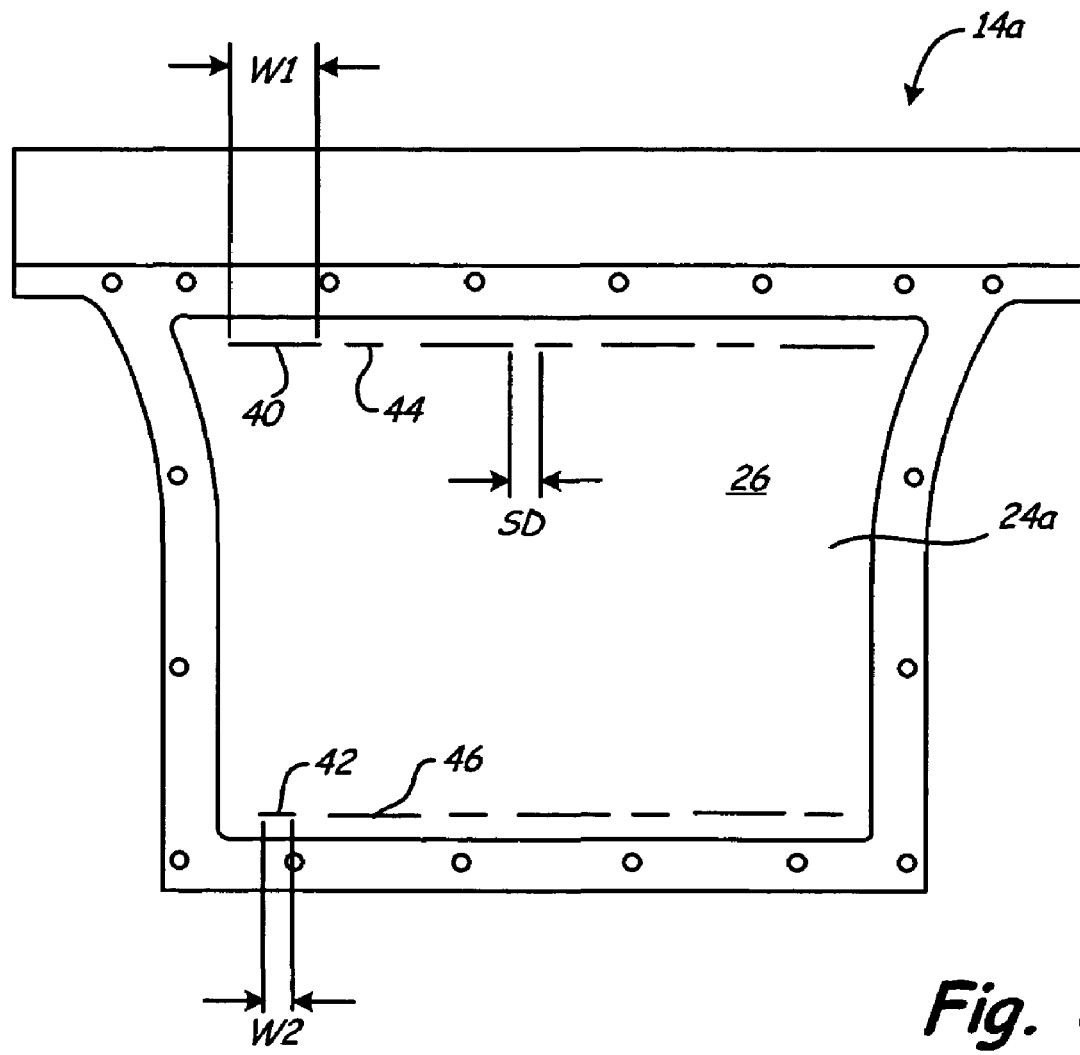
FIGS. 6-8 illustrate various embodiments for repairing a disbonded outer layer of an insulation blanket.

FIG. 6 illustrates one embodiment of repairing insulation blanket 24a of liner segment 14a when a large area of metallized fabric 26 becomes disbanded or detached from underlying ceramic layer 30. A large upper slit 40 is formed in fabric 26 near a detached area of metallized fabric 26. At an opposite end of the detached area, a small lower slit 42 is formed. Large upper slit 40 may have a width W1 of approximately 1.0 to 2.0 inches; small lower slit 42 may have a width W2 of approximately 0.25 to 0.5 inches. Next to large upper slit 40, a small upper slit 44 may be formed which is aligned with a large lower slit 46 near small lower slit 42. As shown in FIG. 6, in embodiments, small and large slits may alternate across a top and a bottom of insulation blanket 24a in those areas where fabric 26 is disbanded from ceramic layer 30, so long as each slit along the top and the bottom of insulation blanket 24a is separated by a minimum distance SD of approximately 0.5 inches.

FIG. 6 represents a scenario in which metallized fabric 26 has essentially become entirely detached from ceramic layer 30 (i.e. from top to bottom of insulation blanket 24a, and from side to side of insulation blanket 24a) inside a perimeter of backing 28; in that case, most of fabric 26 may need to be re-bonded to ceramic layer 30. As such, a repair area in FIG. 6 includes essentially all of insulation blanket 24a that is inside the perimeter of backing 28. In many cases, only a portion of fabric 26 becomes detached from ceramic layer 30; thus, the repair area may only be a percentage of a total area of insulation blanket 24a.

Figure 7:
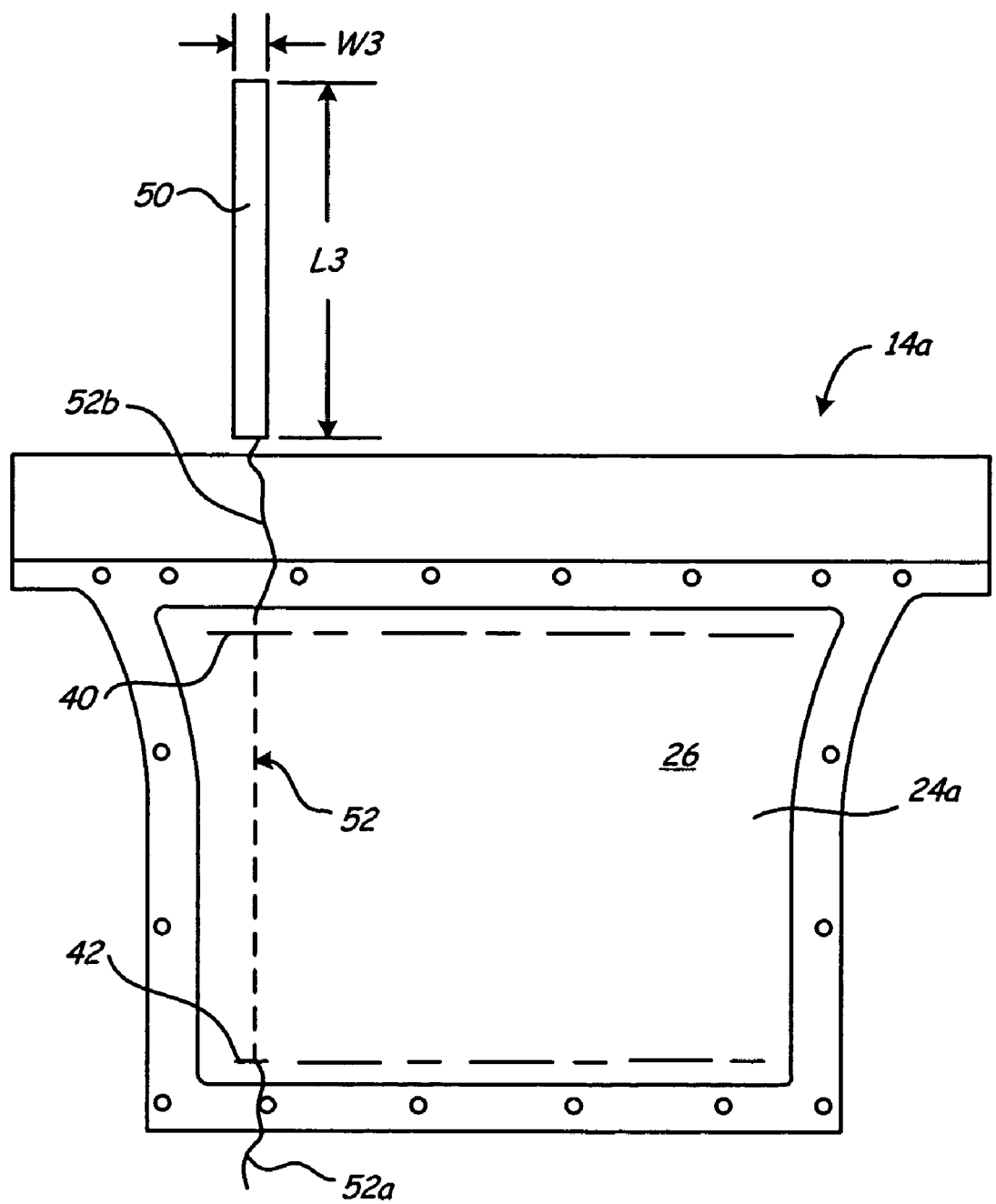

After forming large upper slit 40 and small lower slit 42, detached fabric 26 and underlying ceramic layer 30 may be cleaned using a known cleaning solvent, including, but not limited to, acetone; this is followed by heating insulation blanket 24a to remove the solvent from the fabrics. Next, a repair assembly 50, as shown in FIG. 7, is prepared to be inserted between metallized fabric 26 and ceramic layer 30.

Repair assembly 50 is comprised of a carrier or support material saturated with a bonding material. Suitable support materials include, but are not limited to, ceramic, fiberglass, and other glass fabrics and non-wovens. In embodiments, a fiberglass cloth may be used. The bonding material is an adhesive sealant that is applied to the support material to facilitate bonding of the support material to fabric 26 and ceramic layer 30. Thus, the adhesive sealant may include any material designed to adhere to the support material, metallized fabric 26, and ceramic layer 30.

Silicone rubber is a typical example of an adhesive that may be used due to the thermal requirements of insulation blanket 24a. Alternatively, the support material may already be preimpregnated with the adhesive sealant. In embodiments, the adhesive sealant is a room temperature vulcanized (RTV) silicone rubber.

A primer may be applied to metallized fabric 26 and ceramic layer 30 to prepare layers 26 and 30 for bonding with repair assembly 50. A suitable primer may include, but is not limited to, silane adhesion promoters. Complete coverage of the primer on surfaces 26 and 30 may be important; however, a uniform thickness of the primer may not be required. The primer may be applied to detached surfaces 26 and 30 through known techniques, such as swabbing. Similarly, a primer may be applied to the support material of repair assembly 50. Following application of the primer, layers 26 and 30, as well as repair assembly 50, may then be dried.

FIG. 7 shows repair assembly 50 about to be inserted between a detached portion of metallized fabric 26 and ceramic layer 30 that is between large upper slit 40 and small lower slit 42. Repair assembly 50 includes a support material and an adhesive sealant, as described above. To aid with the insertion of repair assembly 50, guide 52 may be used. An underlying portion of fabric 26 and ceramic layer 30 were prepared for bonding as described above.

As shown in FIG. 7, repair assembly 50 may be cut into a strip having a width W3 of approximately 1.0 inch and a length L3 that is approximate to a length of the disbanded portion of fabric 26 between slits 40 and 42. The strip may be cut either before or after the adhesive sealant is applied to the support material.

Prior to inserting repair assembly 50, first end 52a of guide 52 may be inserted through large upper slit 40 and then out through small lower slit 42. Second end 52b may then be attached to one end of repair strip 50. Next, first end 52a is pulled in order to feed guide 52 out through small lower slit 42 and locate repair strip 50 between small lower slit 42 and large upper slit 40. Repair assembly 50 is then trimmed off near second end 52b of guide 52 to remove guide 52. Any exposed fabric from repair assembly 50 may be pushed back through small lower slit 42.

Light pressure may then be applied to insulation blanket 24a in an area between slits 40 and 42 to smooth out any wrinkles or air bubbles. Insulation blanket 24a may be vacuum bagged to remove any excess adhesive and to hold fabric 26 down to underlying ceramic layer 30. In a final step, insulation blanket 24a may be cured.

Guide 52 of FIG. 7 may be rigid or flexible, depending in part on a distance separating slits 40 and 42. Guide 52 may be a wire, a drag line or other similar devices suitable for feeding repair assembly 50 through large upper slit 40. If there is a large separation between slits 40 and 42, a rigid device may be preferred. In contrast, a flexible device, like a drag line, may be used in situations where slits 40 and 42 are closer together and it is not as difficult to guide the device out through slit 42.

Figure 8:
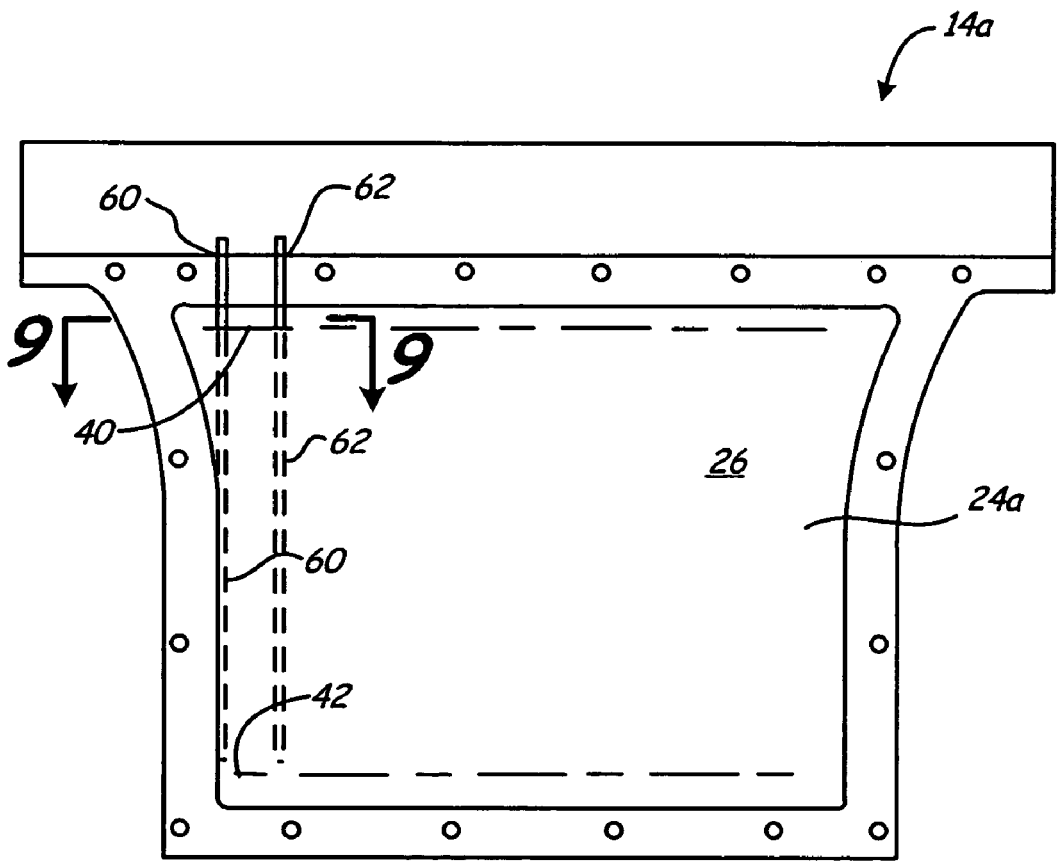

FIG. 8 shows an additional, optional embodiment for rebonding fabric 26 to ceramic layer 30. Prior to an insertion of guide 52 through large upper slit 40 and then out through small lower slit 42, spacers 60 and 62 may be inserted through slit 40 in order to hold apart plies of fabric 26 and 30. As shown in FIG. 8, spacers 60 and 62 are placed at each end of large upper slit 40 such that guide 52 and repair assembly 50 are still able to pass through slit 40. Spacers 60 and 62 may include rods or similar devices, so long as they are free of sharp edges, and may be made of varying lengths to accommodate repair areas of various lengths. Spacers 60 and 62 may be formed from any suitable non-stick material, including, but not limited to PTFE (Teflon™) and other types of plastics.

Figure 9:
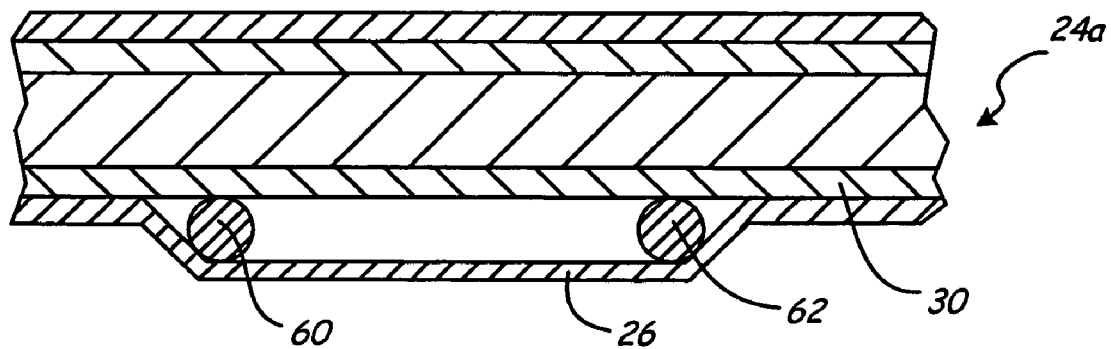
FIG. 9 is a cross-sectional view of the insulation blanket in FIG. 8, including optional spacers between two layers of the insulation blanket.

FIG. 9 is a cross-sectional view of a portion of insulation blanket 24a, including spacers 60 and 62, taken along line 9-9 of FIG. 8. FIG. 9 illustrates a benefit of spacers 60 and 62 to separate metallized fabric 26 from underlying ceramic fabric 30. Spacers 60 and 62 may be inserted through large upper slit 40 prior to applying a primer to surfaces of fabrics 26 and 30 to prevent fabrics 26 and 30 from adhering to one another. Moreover, by creating an opening between layers 26 and 30, spacers 60 and 62 facilitate an insertion of repair assembly 50 between layers 26 and 30.

It is recognized that the steps of the repair method outlined above may be performed in a variety of sequences. The present invention is not limited to only performing the repair in the order described above. Moreover, variations in the repair method are also within the scope of the present invention. For example, as described above in FIG. 7, guide 52 is inserted through large upper slit 40 and then out through small lower slit 42, at which point repair assembly 50 is then attached to end 52b of guide 52. However, it is recognized that guide 52 may instead be inserted through small lower slit 42 and out through large upper slit 40, prior to attachment of repair material 50. Alternatively, repair material 50 may be attached to end 52b of guide 52 prior to insertion of guide 52 through large upper slit 40.

The present invention relates to a repair method for re-bonding a loose fabric layer to an underlying fabric layer. Although the repair method has been described above in reference to an insulation blanket on a fan exit liner segment, it is recognized that the repair method could be used in various other applications in which a fabric layer becomes detached from an underlying layer. More specifically, the repair method may be used in other components of a gas turbine engine which include an insulation blanket. For example, insulation blankets may commonly be attached between a nacelle and an engine component. These insulation blankets may have a similar configuration of a metallized fabric layer and an underlying ceramic layer in which the metallized fabric becomes detached from the ceramic layer and requires repair.

The terminology used herein is for the purpose of description, not limitation. Specific structural and functional details disclosed herein are not to be interpreted as limiting, but merely as bases for teaching one skilled in the art to variously employ the present invention. Although the present invention has been described with reference to preferred embodiments, workers skilled in the art will recognize that changes may be made in form and detail without departing from the spirit and scope of the invention.

The invention claimed is:

1. A method of repairing an insulation blanket that includes a portion of a metallized fabric that is disbonded from an underlying layer, the method comprising:
   cutting a first slit in the metallized fabric near a disbonded portion of the fabric;
   cutting a second slit in the metallized fabric at an opposite end of the disbonded portion of the fabric relative to the first slit;
   inserting a repair material through the first slit by attaching the repair material to a guide and pulling the guide in through the first slit and out through the second slit such that the repair material is between the disbonded portion of the fabric and the underlying layer; and
   adhering the disbonded fabric and the underlying layer to the repair material.

2. The method of claim 1 wherein the first slit has a width of approximately 1.0 to 2.0 inches and the second slit has a width of approximately 0.25 to 0.5 inches.

3. The method of claim 1 wherein the repair material is fiberglass.

4. The method of claim 1 wherein the repair material has a width of approximately 1.0 inch and a length that is approximate to a length of the disbonded portion of the fabric.

5. The method of claim 1 wherein adhering the disbonded fabric and the underlying layer to the repair material includes applying an adhesive to the repair material prior to inserting the repair material through the first slit.

6. The method of claim 5 wherein adhering the disbonded fabric and the underlying layer to the repair material further includes curing the adhesive in the repair material after the repair material is inserted between the disbonded fabric and the underlying layer.

7. The method of claim 1 wherein the metallized fabric is a glass or ceramic fabric coated with aluminum.

8. The method of claim 1 wherein the insulation blanket is configured to be attached to a component of an aircraft engine.

9. The method of claim 1 further comprising:
   inserting spacers through the first slit prior to an insertion of the repair material in order to separate the metallized fabric and the underlying layer.

10. A method of repairing an insulation blanket that includes a portion of a metallized fabric that is disbonded from an underlying layer, the method comprising:
    cutting a first slit and a second slit in the metallized fabric at each end of a region where the metallized fabric has become disbonded from the underlying layer;
    preparing the disbonded region of the metallized fabric for repair;
    preparing a corresponding portion of the underlying layer for repair;
    inserting a repair assembly through the first slit, wherein the repair assembly includes a support material and an adhesive injected into the support material;
    placing the repair assembly between the metallized fabric and the underlying layer; and
    curing the adhesive to adhere the support material to the metallized fabric layer and the underlying layer.

11. The method of claim 10 wherein preparing the metallized fabric and the underlying layer for repair includes applying a primer to the metallized fabric and the underlying layer.

12. The method of claim 11 wherein the primer is a silane adhesion promoter.

13. The method of claim 10 wherein inserting a repair assembly through the first slit is performed by a guide that is attached to an end of the repair assembly, and the guide is inserted through the first slit in the metallized fabric and out through the second slit.

14. The method of claim 10 further comprising:
inserting spacers through the first slit prior to an insertion of the repair assembly in order to separate the metallized fabric and the underlying layer.

15. The method of claim 10 wherein the metallized fabric is individually coated with aluminum.

16. The method of claim 10 wherein the underlying layer is ceramic.

17. The method of claim 10 wherein the support material of the repair assembly is a woven fiberglass.

18. The method of claim 10 wherein the adhesive of the repair assembly is a room temperature vulcanized silicone rubber.

* * * * *

UNITED STATES PATENT AND TRADEMARK OFFICE
CERTIFICATE OF CORRECTION

PATENT NO. : 7,695,585 B2
APPLICATION NO. : 11/517769
DATED : April 13, 2010
INVENTOR(S) : Bogue et al.

It is certified that error appears in the above-identified patent and that said Letters Patent is hereby corrected as shown below:

Abstract: should read:

A method and system for repairing an insulation blanket having a metallized fabric that becomes ~~disbanded~~ disbonded from an underlying layer of the insulation blanket. The method includes cutting a first slit in the metallized fabric near a ~~disbanded~~ disbonded portion of the fabric, inserting a repair material through the first slit such that the repair material is between the ~~disbanded~~ disbonded portion of the fabric and the underlying layer, and adhering the disbonded fabric and the underlying layer to the repair material to restore the functionality of the metallized fabric.

In column 1, line 17, delete "disbanded", and insert --disbonded--

In column 1, line 34, delete "disbanded", and insert --disbonded--

In column 1, line 41, delete "disbanded", and insert --disbonded--

In column 1, line 46, delete "disbanded", and insert --disbonded--

Signed and Sealed this

Twenty-seventh Day of July, 2010

David J. Kappos
*Director of the United States Patent and Trademark Office*

UNITED STATES PATENT AND TRADEMARK OFFICE
CERTIFICATE OF CORRECTION

PATENT NO. : 7,695,585 B2  Page 1 of 1
APPLICATION NO. : 11/517769
DATED : April 13, 2010
INVENTOR(S) : Bogue et al.

It is certified that error appears in the above-identified patent and that said Letters Patent is hereby corrected as shown below:

Title Page, Item (57) Abstract: should read:

A method and system for repairing an insulation blanket having a metallized fabric that becomes ~~disbanded~~ disbonded from an underlying layer of the insulation blanket. The method includes cutting a first slit in the metallized fabric near a ~~disbanded~~ disbonded portion of the fabric, inserting a repair material through the first slit such that the repair material is between the ~~disbanded~~ disbonded portion of the fabric and the underlying layer, and adhering the disbonded fabric and the underlying layer to the repair material to restore the functionality of the metallized fabric.

In column 1, line 17, delete "disbanded", and insert --disbonded--

In column 1, line 34, delete "disbanded", and insert --disbonded--

In column 1, line 41, delete "disbanded", and insert --disbonded--

In column 1, line 46, delete "disbanded", and insert --disbonded--

This certificate supersedes the Certificate of Correction issued July 27, 2010.

Signed and Sealed this

Twenty-fourth Day of August, 2010

David J. Kappos
*Director of the United States Patent and Trademark Office*